Oct. 24, 1944.  W. B. BRONANDER  2,360,846
MACHINE FOR MAKING AND FILLING PACKAGES
Filed Oct. 15, 1941  11 Sheets-Sheet 1

INVENTOR
Wilhelm B. Bronander
BY
Marshall & Hawley
ATTORNEYS

Oct. 24, 1944.  W. B. BRONANDER  2,360,846
MACHINE FOR MAKING AND FILLING PACKAGES
Filed Oct. 15, 1941  11 Sheets-Sheet 2

INVENTOR
Wilhelm B. Bronander
BY
Marshall + Hawley
ATTORNEYS

Oct. 24, 1944.　　W. B. BRONANDER　　2,360,846
MACHINE FOR MAKING AND FILLING PACKAGES
Filed Oct. 15, 1941　　11 Sheets-Sheet 3

INVENTOR
Wilhelm B. Bronander
BY
Marshall H Hawley
ATTORNEYS

Oct. 24, 1944.   W. B. BRONANDER   2,360,846
MACHINE FOR MAKING AND FILLING PACKAGES
Filed Oct. 15, 1941   11 Sheets-Sheet 4

INVENTOR
Wilhelm B. Bronander
BY
Marshall & Hawley
ATTORNEYS

Oct. 24, 1944.   W. B. BRONANDER   2,360,846
MACHINE FOR MAKING AND FILLING PACKAGES
Filed Oct. 15, 1941   11 Sheets-Sheet 5

INVENTOR
Wilhelm B. Bronander
BY
Marshall & Hawley
ATTORNEYS

Oct. 24, 1944.  W. B. BRONANDER  2,360,846
MACHINE FOR MAKING AND FILLING PACKAGES
Filed Oct. 15, 1941    11 Sheets-Sheet 7

INVENTOR
Wilhelm B. Bronander
BY
Marshall & Hawley.
ATTORNEYS

Oct. 24, 1944. W. B. BRONANDER 2,360,846
MACHINE FOR MAKING AND FILLING PACKAGES
Filed Oct. 15, 1941 11 Sheets-Sheet 8

INVENTOR
Wilhelm B. Bronander
BY
Marshall & Hawley
ATTORNEYS

Patented Oct. 24, 1944

2,360,846

UNITED STATES PATENT OFFICE 2,360,846

MACHINE FOR MAKING AND FILLING PACKAGES

Wilhelm B. Bronander, Montclair, N. J.

Application October 15, 1941, Serial No. 415,002

10 Claims. (Cl. 93—3)

This invention relates to machines for making and filling packages.

More particularly stated, the invention relates to a machine for packaging material, such as tobacco.

The invention has for its salient object to provide a simple, practical and efficient machine for forming, labeling, filling and sealing a package with a predetermined quantity of material, such as tobacco.

Another object of the invention is to provide a machine for forming a package of tin foil, the machine being so constructed and arranged that the foil paper can be given right angle folds thereby enhancing the appearance of the package.

Another object of the invention is to facilitate the filling of the package by filling the packages in lots or batches, the batches being deposited in a plurality of packages simultaneously.

Another object of the invention is to provide a machine of the character described with simple, practical and efficient means for measuring and loading uniform quantities of material.

Further objects of the invention will appear from the following specification taken in connection with the drawings which form a part of this application, and in which.

The invention briefly described consists of a machine comprising a plurality of mechanisms operable in sequence and these mechanisms will be described in the order in which their operation is carried out. The wrapper is first formed from a sheet of foil having a paper lining and the web of tin foil first passes through scoring means which scores the sheet at the intervals therein where the sheet is to be folded. This facilitates the folding operation and permits the placing of right angle folds therein. The sheet of tin foil with the paper lining is fed across the path of movement of mandrels or formers which are carried by endless carriers through the machine. Suitable folding mechanism folds the tin foil paper wrapper around the former, the formers or mandrels being open at both ends.

The machine also has mechanism for feeding and folding paper sheets around the folded tin foil sheets or wrappers, these paper covers being folded around the advance end, sides and front and back surfaces of the tin foil wrapper which has been previously formed on the mandrel.

The mandrels and packages formed thereon are thereafter passed through sealing means and the mandrels are then rotated from horizontal to vertical position and pass beneath the discharge ends of funnels which receive measured quantities of material from tobacco measuring and discharge mechanism. The tobacco is so measured and discharged that half a load enters the package through the funnel and mandrel from the first funnel and the other half of the load is discharged through the second funnel into the mandrel and package. Thereafter the mandrels with the loaded packages thereon pass beneath tamping mechanism which tamps the tobacco down through the mandrel into the package and ejects the package from the mandrel. From the tamping mechanism the filled package passes through mechanism which places end tucks in the upwardly projecting portions of the wrapper and through other mechanism which folds the two end flaps thereby closing the packages.

Further details of the invention will appear from the following description.

Figure 13:
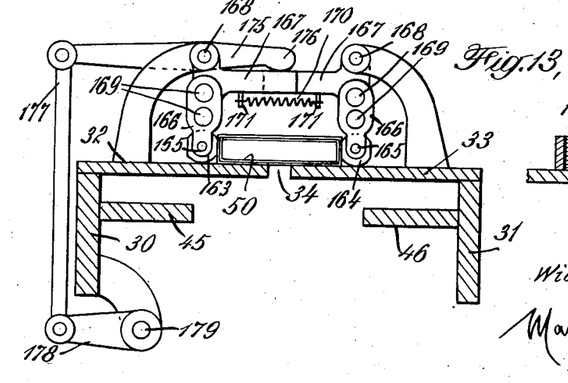
Fig. 13 is a vertical sectional elevation on an enlarged scale taken substantially on line 13—13 of Fig. 2B and showing the presser and sealing means for the side folds of the package.
Figure 14:
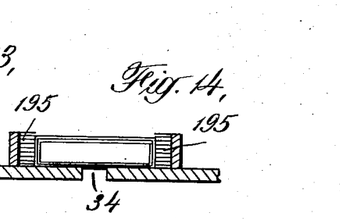
Fig. 14 is a vertical sectional elevation taken substantially on line 14—14 of Fig. 2B and showing brushes for holding the side folds in folded condition.

In the particular embodiment of the invention illustrated the machine frame is formed by a pair of side members 30 and 31 having mounted on the upper ends thereof inwardly projecting horizontal supporting members 32 and 33. The members 32 and 33 are separated by a slot 34 through which extend brackets or lugs 35 which are carried by or secured to sleeves 36 mounted on cross pins 37. Each of the cross pins is provided with rollers 38 and 39 at the ends thereof and each pin is mounted on a chain at each end thereof, as shown at 40 and 41. The rollers 38 and 39 are disposed between ledges or rails 45 and 46 (Fig. 13) and the horizontal frame members or supports 32 and 33.

Each bracket 35 has secured thereto a hollow open ended rectangular mandrel or former 50.

These formers are carried through the machine by the chains 40 and 41 and the brackets 35 are so secured to the formers that the weight of the advance end of the former will tend to retain the former in horizontal position until it is rotated out of this position in a manner hereinafter described.

Each of the sleeves 36 has secured thereto a bell crank lever comprising a pair of arms 51 and 52. The former or mandrel is rotated by the engagement of suitable control or guiding means with rollers 53 and 54 at the ends of the bell crank lever.

Figures 1A, 3, 4:
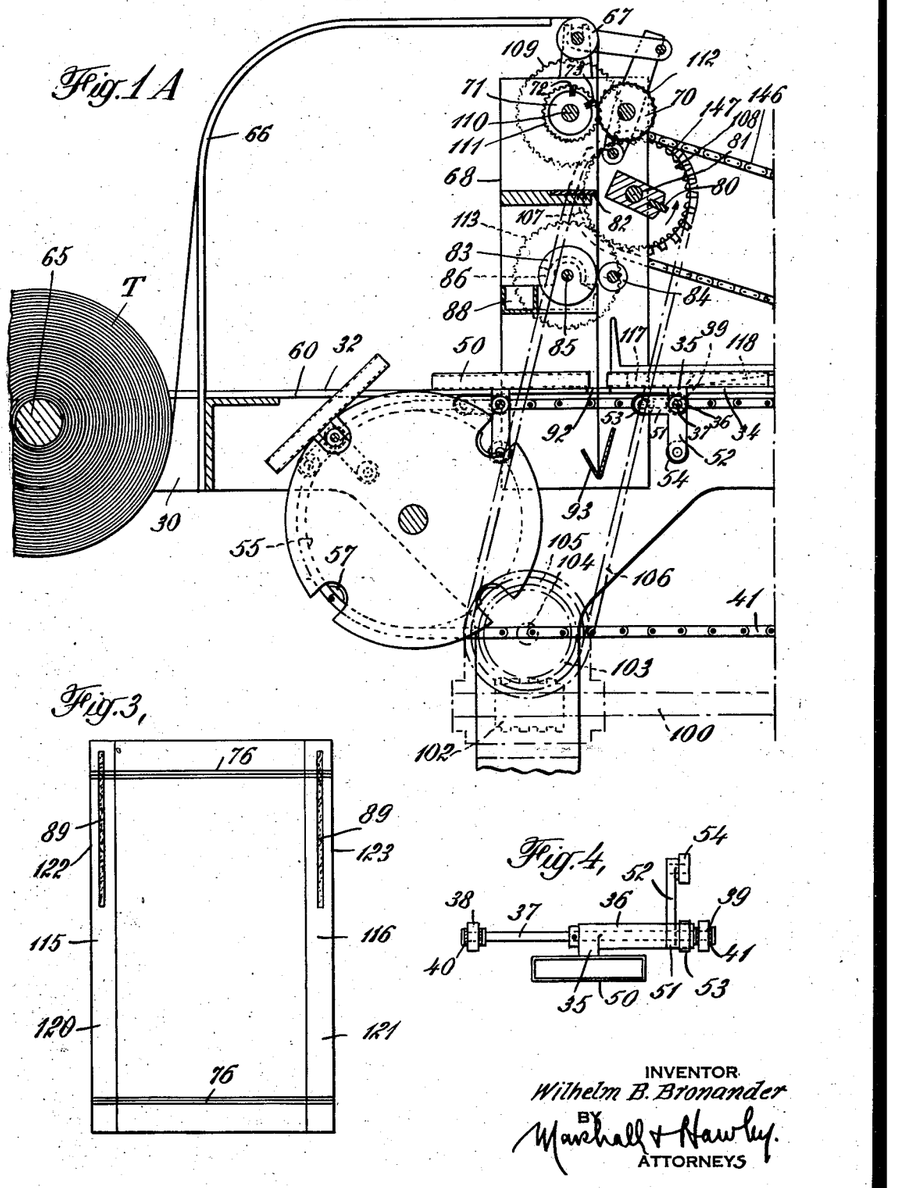
Fig. 1A is a vertical sectional elevation showing the means for feeding and cutting the tin foil paper liner of the package.
Fig. 3 is a plan view of the paper surface of the tin foil paper liner showing the glue applied thereto.
Fig. 4 is a plan view showing the mounting of the mandrels or formers on which the packages are formed.
Figure 1B:
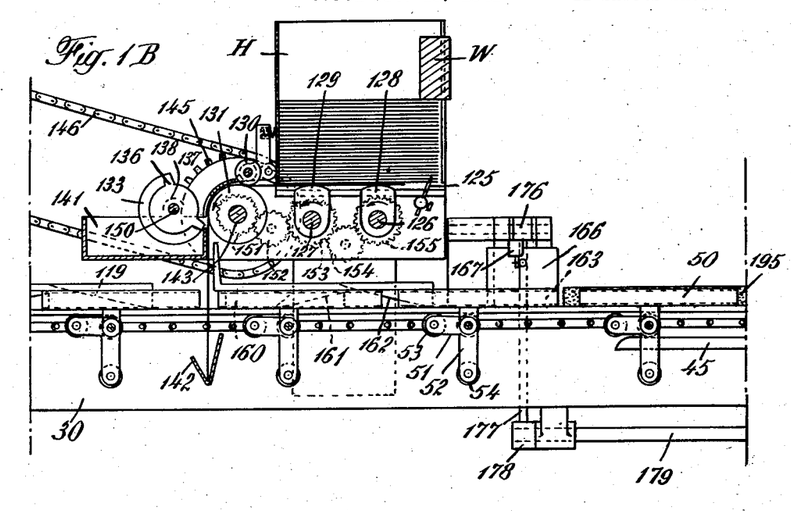
Fig. 1B is a vertical sectional elevation through the label or paper cover feeding mechanism.

The chains 40 and 41 are mounted on two pairs of sprocket wheels at the two ends of the machine. Fig. 1A shows one of the pair of sprocket wheels 55 at the entering end of the machine and Fig. 1D shows one of the sprocket wheels 56 at the other end of the machine. The sprockets 56 are mounted on and driven intermittently by a shaft 111 in a manner which will be described later. These wheels are provided with recesses 57 and 58 to receive the rollers 38 and 39 at the ends of the cross pins 37.

The members 32 and 33 are cut away, as shown at 60 in Fig. 1A, to permit the formers to move upwardly to a position above the frame members or supports 32 and 33. In this position the roller 53 is disposed beneath the support 32. The weight of the advance end of the mandrel tends to maintain the roller 53 in engagement with the undersurface of the member 33.

In order to facilitate the description of the various parts of the machine the mechanisms are designated on Fig. 27 as follows:

A—tin foil feeding, cutting and folding mechanism;

B—label feeding, glueing and folding mechanism;

C—tobacco feeding and tamping mechanism;

D—package closing and discharge mechanism.

*Tin foil paper feeding, scoring and cutting mechanism*

Figure 27:
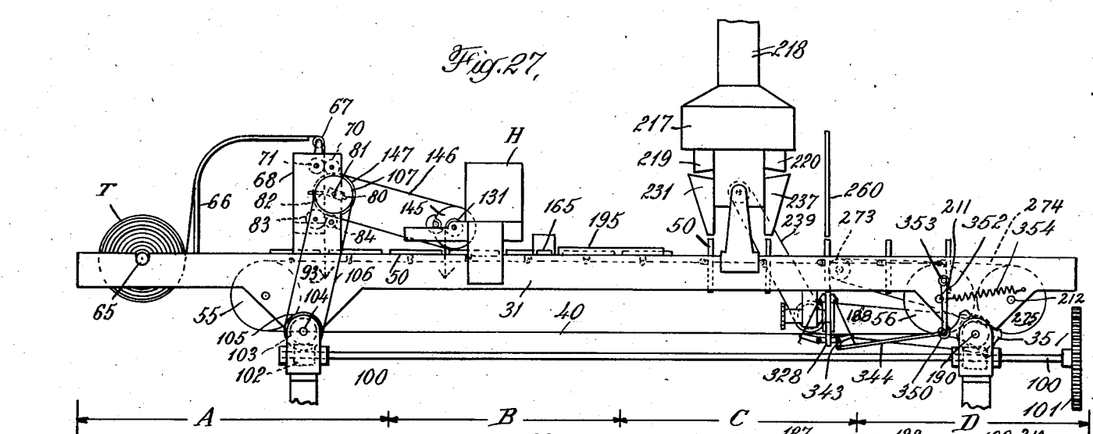
Fig. 27 is an elevational view of the machine.
Figure 28:
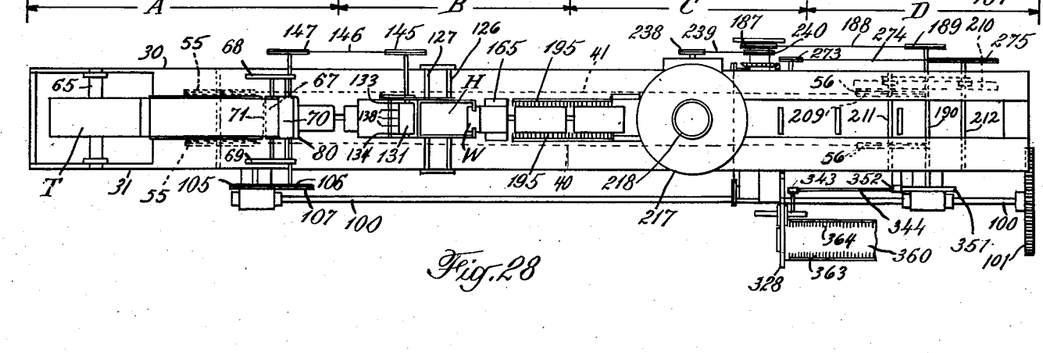
Fig. 28 is a plan view of the machine.

This mechanism is illustrated particularly in Figs. 1A, 2A, 5, 6 and 7, and at A in Fig. 27.

The tin fold paper web is supported in the form of a supply roll T mounted on a spindle 65, which rests in grooves in the side members 30, 31. This web is carried upwardly around a curved support and guide 66 which extends to a position adjacent a guide roller 67 around which the web is led. The roller 67 and the scoring, cutting and glueing mechanism about to be described are supported on vertical frame member 68 and 69 mounted on the frame supporting members 32 and 33.

Figures 2A, 5:
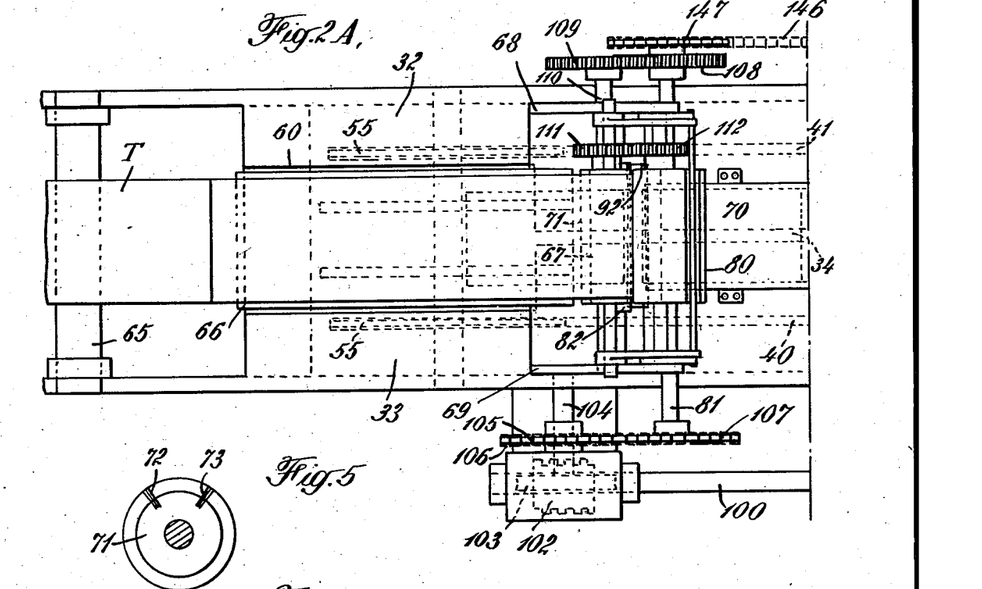
Fig. 2A is a top plan view of the structure shown in Fig. 1A.
Fig. 5 is an end elevation of the roll for scoring the tin foil paper sheet.
Figure 2B:
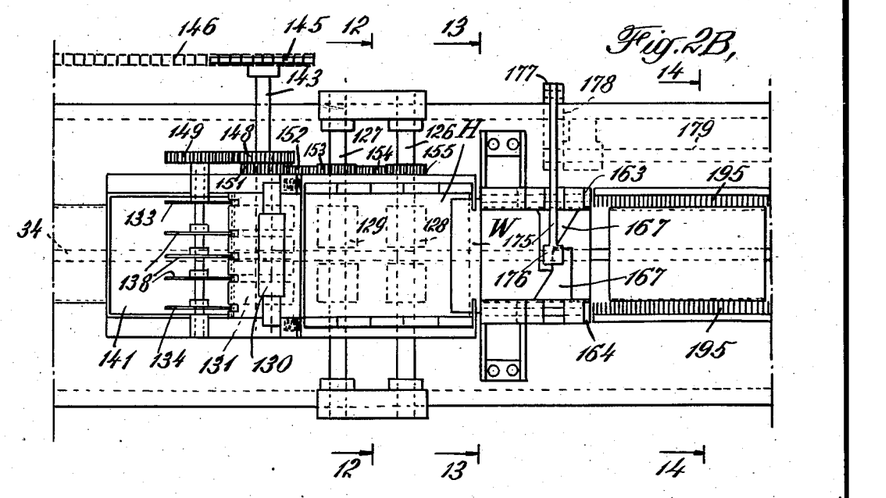
Fig. 2B is a top plan view of the structure shown in Fig. 1B.

From the roller 67 the web of tin foil is carried downwardly between a pair of rolls 70 and 71, the roll 71, as shown particularly in Figs. 1A and 5, being provided with extending scoring blades for scoring the tin foil sheet. As shown at 72 and 73, two sets of three scoring blades are provided. The blades 72 and 73 form triple, parallel scores as shown in Fig. 3 at 76. The rollers 70 and 71 are preferably surfaced with rubber or resilient material and the scoring blades extend through the outer surfaces of the roller 71. It is difficult to accurately fold the sheet or wrapper around the end of the mandrel and therefore the projecting ends of the wrapper are not always of equal length. By providing a plurality of parallel fold lines 76, this condition is taken care of and the end folds can be made to form square corners.

From the scoring roll the material passes downwardly and is cut by a rotatable knife 80 mounted on a shaft 81 and coacting with a stationary knife 82. The sheet passes downwardly from the cutting mechanism between a pair of feed rolls 83 and 84, (see Figs. 1A and 7). The roll 83 is mounted on a shaft 85 which also has mounted thereon a pair of disks 86 and 87, each disk extending through approximately one-half of a circumference, as shown in Fig. 1A. Shaft 85 is speeded up to feed faster than the cutting mechanism. The disks 86 and 87 rotate through a well or tank 88 of suitable glue material and engage portions of the paper side of the tin foil paper sheet, placing strips 89 of glue thereon, as shown in Fig. 3. The roll 84 is recessed at 90 and 91 opposite the disks 86 and 87.

From the feed rolls 83 and 84 the tin foil sheets pass downwardly through an opening 92 in the members 32 and 33 into a V-shaped pocket or support 93 which supports the tin foil sheet in the path of movement of the mandrels 50.

The feeding, scoring, cutting, and glueing mechanism above described is driven in the following manner: The driving connections are shown particularly in Figs. 1D, 2D and 1A and 2A. The main drive shaft is shown in Fig. 2D at 100, this shaft having a gear 101 mounted at one end thereof driven from any suitable source of power, such as an electric motor. At its other end the shaft 100 has mounted thereon a worm 102 which meshes with a worm wheel 103 mounted on a shaft 104 (Figs. 1A, 2A). The shaft 104 also has mounted thereon a sprocket wheel 105 which is connected by a chain 106 to a sprocket wheel 107 mounted on the shaft 81 of the rotary cutting knife 80. The shaft 81 also has secured thereto a gear 108 which meshes with a gear 109 mounted on the shaft 110 of the score roll 71. Shaft 110 has a gear 111 which meshes with the gear 112 on the shaft of the feed roll 70.

Gear 108 also meshes with a gear 113 mounted on the shaft 85 of the feed roll 83. The gearing is so proportioned as to speed up the shaft 85 and rolls 83 and 84.

Figure 8:
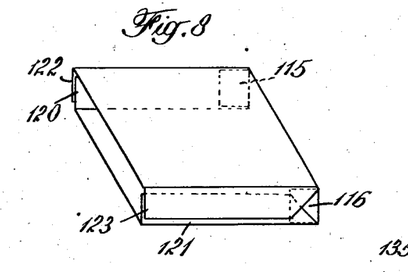
Fig. 8 is a perspective view showing the tin foil blank folded into a wrapper.

As the mandrel engages the vertically supported tin foil sheet as in Fig. 1A, the sheet is folded around the advance end of the mandrel on the scoring lines 76, 76 and against the upper and lower surfaces of the mandrel. End tucks are formed in the portions 115 and 116 of the tin foil wrapper or blank (see Figs. 3 and 8). These tucks are formed by stationary tuckers 117 (Fig. 1A) in the customary manner and the sides of the wrapper project laterally beyond the sides of the mandrel and are folded against the sides of the mandrel by suitable slots 118 and 119, shown in Fig. 1A and Fig. 1B. The portions 120 and 121 of the tin foil blank shown in Figs. 3 and 8 are first folded upwardly by the slots 118 and thereafter the portions 122 and 123 are folded downwardly by the slots 119 thereby causing the strips of glue 89, 89 to engage the outer surfaces of the portions 120, 121. The tin foil wrapper thus takes the form shown in Fig. 8.

*Label or paper cover feeding and folding mechanism*

This mechanism is shown at B on Fig. 27 and is particularly illustrated in Figs. 1B, 2B, 9, 10, 11 and 12. The paper wrappers are mounted in a hopper H shown in Figs. 1B and 12. A weight W rests on the pile of wrapper sheets. At the bottom of the hopper there is mounted a pair of upwardly extending spikes or pins 125 which extend upwardly into the sheets at the bottom of the hopper.

Figure 9:
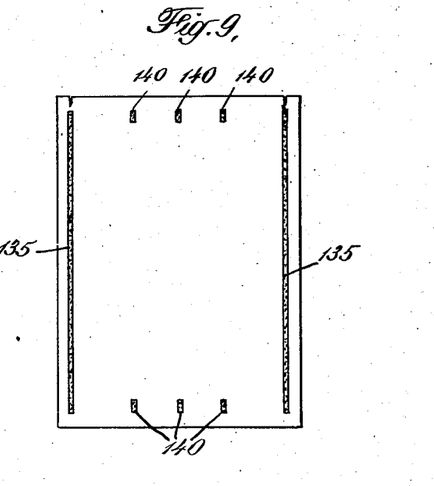
Fig. 9 is a plan view of the paper sheet or label showing the glue applied thereto.

Mounted below the hopper are a pair of shafts 126 and 127 on which are mounted feed members 128 and 129 which when rotated engage the undersurface of the lower sheet and feed the sheet to the left viewing Fig. 1B and from beneath the stack of wrapper sheets. From the hopper each sheet is fed between a pair of feed rolls 130 and 131 and around the feed roll 131 downwardly. As the sheet is fed downwardly it is engaged by a pair of disks 133 and 134 which place strips 135 of glue thereon, as shown in Fig. 9. The sheet is also engaged by lugs 136 and 137 formed on disks 138, these lugs placing on the disks a plurality of dabs of glue 140, as shown in Fig. 9. The disks which carry the glue rotate through a supply of glue carried by a receptacle 141.

The wrapper sheets from the hopper are fed downwardly through openings formed in the members 32 and 33 into a V-shaped pocket 142.

The wrapper feeding mechanism above described is driven in the following manner: Shaft 143 of the feed roll 131 has mounted thereon a sprocket wheel 145 which is connected by a chain 146 to a sprocket wheel 147 mounted on the shaft 81.

Figure 10:
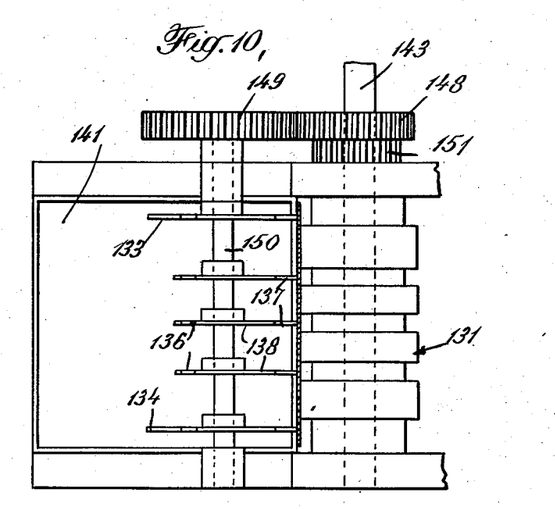
Fig. 10 is a plan view on an enlarged scale of the means for applying glue to the label or cover sheet.

Shaft 143 also has secured thereto a gear 148 which meshes with a gear 149 mounted on a shaft 150 which carries the glue applying disks 133, 134 and 138 (Fig. 10).

Shaft 143 also has secured thereto a gear 151 which meshes with an idler gear 152 which in turn meshes with a gear 153 mounted on the shaft 127. Gear 153 also meshes with an idler gear 154 which in turn meshes with a gear 155 mounted on the shaft 126 (Fig. 1B).

By the mechanism and driving connections just described the wrapper sheets shown in Fig. 9 are fed downwardly into the path of movement of the mandrels upon which have been folded the tin foil wrapper shown in Fig. 8. As the mandrel moves forwardly the wrapper sheet is folded, in the same manner as the tin foil wrapper, around the tin foil wrapper, tucks being placed therein by tuckers 160. The projecting lower flaps are folded upwardly by the folding slots 161 and the projecting upper flaps are then folded downwardly by the slots 162 in the usual well known manner. The folded paper sheet or cover then takes the form shown in Fig. 11.

*Fold heating and pressing mechanism*

Figures 1C, 15, 16:
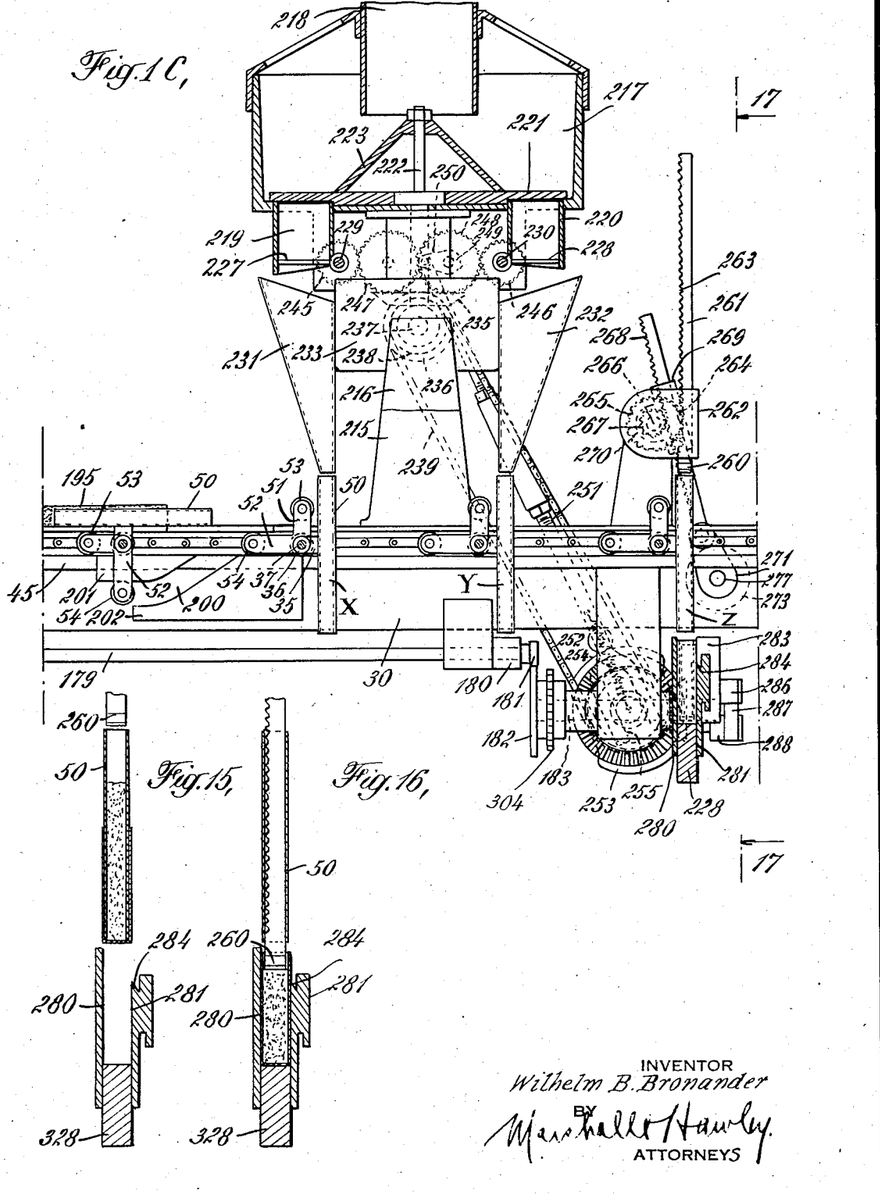
Fig. 1C is an elevation partly in section showing the tobacco measuring and feeding mechanism and the tamping means for tamping the tobacco.
Fig. 15 is a vertical sectional elevation showing the filled package with the tamper about to descend into the mandrel and package.
Fig. 16 is a view similar to Fig. 15 but showing the tamper in its lowest position of movement after the material has been tamped into the package and the package has been discharged from the mandrel.
Figure 1D:
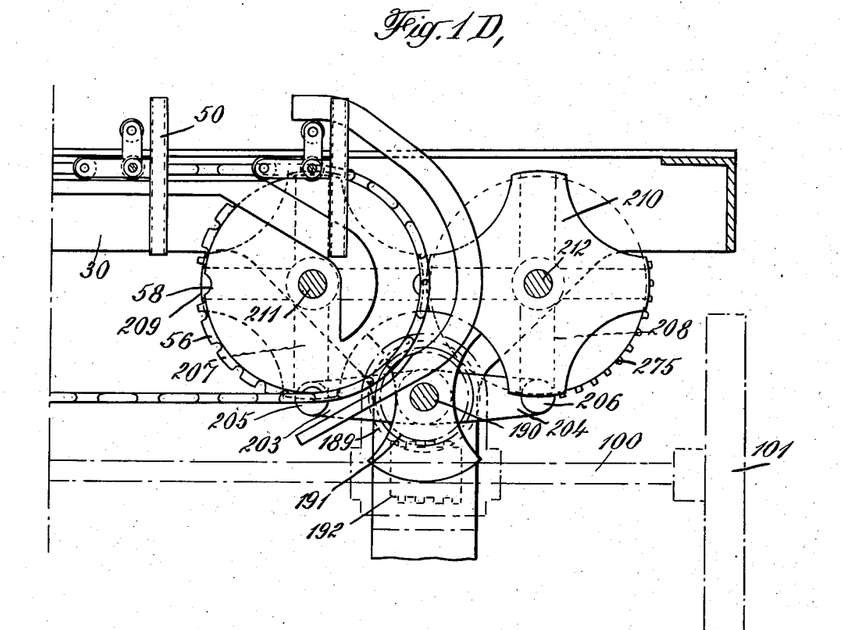
Fig. 1D is an elevational view partly in section showing the drive for the feed chains which carry the mandrels.
Figures 18, 19, 20, 22:
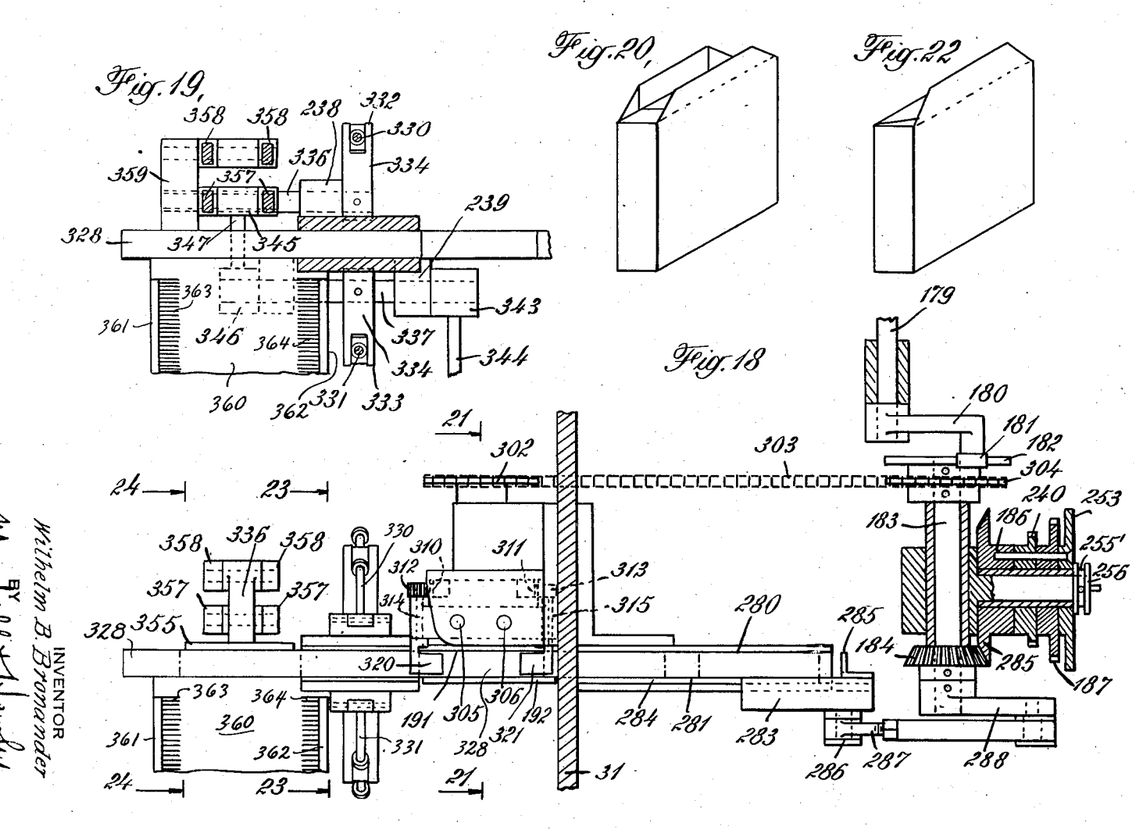
Fig. 18 is a horizontal sectional elevation taken substantially on line 18—18 of Fig. 17.
Fig. 19 is a horizontal sectional elevation taken substantially on line 19—19 of Fig. 17.
Fig. 20 is a perspective elevational view showing the package with the end tucks completed prior to the closing of the end flaps.
Fig. 22 is a perspective elevation of the package with one of the end flaps folded prior to the folding of the final end flap.

This mechanism is illustrated particularly in Figs. 1B, 2B, 13 and 14 and the driving connections are shown in Fig. 1C and Fig. 18. After the sides of the wrapper have been folded in the manner shown in Fig. 11, the mandrels and wrappers thereon pass between a pair of presser members 163 and 164 which are pivoted at 165 on the lower ends of bell crank levers having arms 166 and 167, the bell crank levers being mounted on pivots 168. Suitable electric heating means 169 is provided for heating the pressers 163 and 164. The bell crank levers are normally held in the position shown in Fig. 13 by means of a spring 170 which engages lugs 171 on the arms 167 and tends to pull the arms 166 of the bell crank levers toward each other, thereby pressing the pressers against the side folds of the wrapper.

The bell crank levers are operated by a lever 175 mounted on the pivot 168, the inner end 176 of the lever 175 engaging the arms 167 of the bell crank levers. The other end of the levers 175 is connected by a link 177 to an arm 178 fixed on a shaft 179. From the showing in Figs. 1B and 18 it will be seen that the shaft 179 has fixed to its other end a crank 180 on the end of which is mounted a roller 181 which engages a cam 182 mounted on a shaft 183. Shaft 183 also has secured thereto a bevel gear 184 which meshes with a bevel gear 185. This gear has a hub 186 which is pinned to the hub of a sprocket wheel 187. Sprocket wheel 187 is driven by a chain 188 (Fig. 2C) and the chain 188 is driven by a sprocket wheel 189 (Fig. 2D) mounted on a shaft 190. As shown in Figs. 1D and 2D, shaft 190 has mounted thereon a worm wheel 191 which is driven by a worm gear 192 mounted on the shaft 100. The shaft 190 is continuously driven and through the gearing connections just described drives the shaft 183 which, through the cam 182, oscillates the crank arm 180 and shaft 179.

The members 163 and 164 press and heat the side folds and dry the glue, thereby sealing the sides of the wrapper. In order to hold these folded sides in position after they pass from the heaters and to further facilitate the sealing, the mandrels and wrappers thereon pass between brushes 195 shown particularly in Fig. 14.

*Tobacco measuring and loading mechanism*

This mechanism is shown particularly in Figs. 1C, 2C, 15 and 16. After passing between the brushes 195 the mandrels reach the position shown at the left in Fig. 1C and, as shown in this figure, a cam track or groove 200 is formed between members 201 and 202, this cam groove or track being positioned to receive the roller 54 on the end of the arm 52. As the mandrel moves forwardly by the action of the feed chains the bell crank lever 51, 52 and the mandrel carried thereby are tilted through a right angle, as shown in Fig. 1C, thus disposing the mandrel in vertical position with the wrapper around the lower portion thereof and the upper end open, as shown at X in Fig. 1C and in Fig. 15.

The chains are operated intermittently by the driving connections shown in Figs. 1D and 2D. In these figures it will be noted that the shaft 190 has secured thereto a pair of arms 203 and 204 on the outer ends of which are rollers 205 and 206 which enter radially disposed guideways 207 and 208 of Geneva wheels 209 and 210. The Geneva wheel 209 is mounted on a shaft 211 and the Geneva wheel 210 is mounted on the shaft 212. These Geneva wheels are operated in the usual well known manner by the arms 203 and 204 on the shaft 190.

The tobacco measuring and loading mechanism is carried by a pair of brackets 215 and 216 carried by the frame members 30 and 31. This mechanism includes a casing or chamber 217 fixedly mounted and having a feed conduit 218 extending downwardly thereinto through which the tobacco or other material is fed to the chamber 217. The casing or chamber 217 has fixed thereto and extending downwardly therefrom a pair of feed pockets 219 and 220 which receive the tobacco from the chamber 217 when the upper ends of the pockets are opened by a rotatable disk valve 221 mounted on a vertical spindle 222. A cone 223 is mounted on the spindle 222 above the disk to direct the material laterally as it is fed into the chamber through the conduit 218.

Figure 2C:
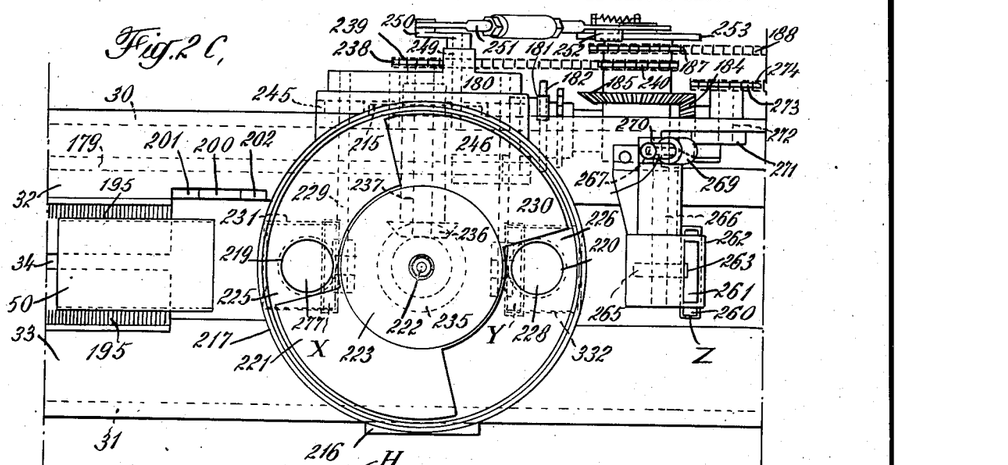
Fig. 2C is a top plan view of the structure shown in Fig. 1C.
Figure 2D:
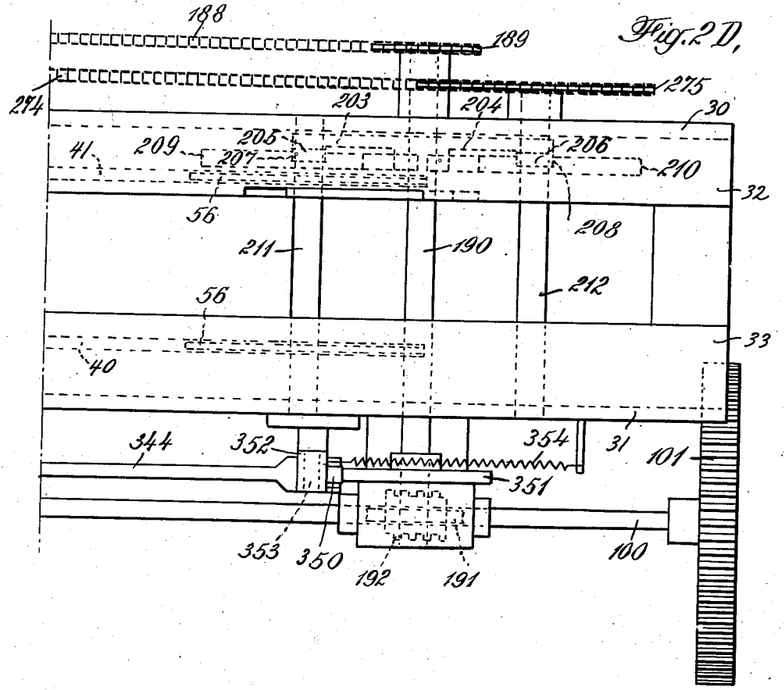
Fig. 2D is a plan view of the structure shown in Fig. 1D.
Figure 6:
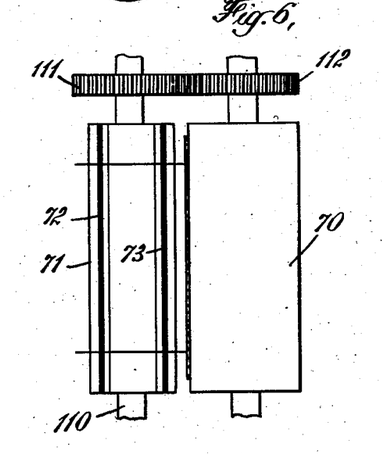
Fig. 6 is a top plan view of the scoring roll and coacting presser roll.
Figure 7:
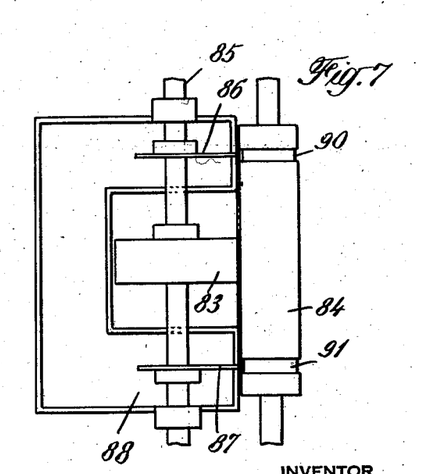
Fig. 7 is a top plan view of the glue applying means for the tin foil paper sheet.

The disk valve has arcuate openings therethrough designated 225 and 226 on Fig. 2C, these openings being disposed diametrically opposite each other. As these openings pass over the open upper ends of the pockets 219 and 220, a charge or load of material, such as tobacco, drops into the pockets.

The lower ends of the pockets 219 and 220 are provided with flap valves 227 and 228 carried by spindles 229 and 230 which are operated at the desired intervals and in a manner hereinafter described to drop the loads in the pockets into downwardly extending funnels 231 and 232. The lower ends of these funnels are disposed over successive positions of the vertically disposed mandrels whereby the load therein is deposited in the upper open ends of the mandrels around the lower ends of which are disposed the wrappers or packages to receive the material. The funnels 231 and 232 are carried by a fixed frame or fixed frame members 233 and suitable frame work is also provided for supporting the chamber 217 and other working parts of the tobacco measuring and feeding mechanism. This frame work is carried by the brackets 215 and 216.

The pockets 219 and 220 are so dimensioned as to receive one-half of a load of material and when the mandrel reaches the position designated X in Fig. 1C one-half of the load is deposited in the mandrel and when the mandrel reaches the position Y the remaining half of the load is deposited therein.

The feed disk 221, spindle 222 and flap valves are operated by the following driving connections:

Spindle 222 has mounted thereon a bevel gear 235 which meshes with a bevel gear 236 carried by a shaft 237 on the other end of which is mounted a sprocket wheel 238 which is driven by a chain 239 from the sprocket wheel 240. The sprocket wheel 240, as shown in Fig. 18, is fixed to the sprocket wheel 187 which in the manner above described is driven by the chain 188 and sprocket wheel 189 from the shaft 190. (See Figs. 1D and 2D.)

The flap valves 227 and 228, as above stated, are carried by spindles 229 and 230 on which are mounted gears 245 and 246 which mesh with intermeshing gears 247 and 248. Gear 248 is mounted on a spindle 249 which also has secured thereto a crank 250 which is connected to a link 251. The other end of the link 251 carries a roller 252 which is held in engagement with a cam 253 by a spring 254. The cam 253 is also pinned to the sprocket wheel 187. The lower end of the link 251 is bifurcated, as shown at 255, and the bifurcated ends are guided in grooves 255' in a member 256 mounted on the axis of the cam 253.

As the cam 253 is rotated in the manner just described in the link 251 will be reciprocated thereby oscillating the crank 250, shaft 246 and from this shaft through the gear connections oscillating the flap valves 227 and 228. It will be understood that the connections above described are so timed as to open the flap valves after a charge has been disposed therein and when the disk 221 is closing the upper ends of the pockets 219 and 220.

It will be understood that the pockets 219 and 220 can, if desired, be dimensioned to receive a full load of material. In this case the feed of the mandrels would be regulated to feed the carrier two steps, to improve the filled mandrels and packages from beneath chute 231 and 231 and replace them by empty mandrels and packages.

Tamping mechanism

After the load has been deposited in the open upper ends of the mandrels in the manner above described, the mandrels are moved to the next successive position of movement shown at Z in Fig. 1C. Thereafter a tamper or plunger descends into the mandrel compressing the material therein and forcing the loaded package from the lower end of the mandrel, as shown in Fig. 16. In connection with the following description, attention is particularly directed to Figs. 1C, 17 and 18.

When the mandrel reaches the position shown at Z it is disposed below the lower end of a plunger or tamper 260 having a shank 261 slidably mounted in a bracket 262. The shank 261 is in the form of a rack having rack teeth 263 which are engaged by gear teeth 264 carried by a gear 265 mounted on a shaft 266. The shaft 266 also has secured thereto a gear 267 which meshes with teeth carried by a rack 268. The rack 268 is slidably mounted in a sleeve 269 having lugs 270 pivoted on the shaft 266. The lower end of the rack 268 is connected to a crank 271 carried by a shaft 272 which also has mounted thereon a sprocket wheel 273. (See Figs. 17 and 1C.) The sprocket wheel 273 is driven by a chain 274 which in turn is driven by a sprocket wheel 275 mounted on the shaft 212. (See Figs. 1D and 2D.) Since the shaft 212 is driven by the Geneva wheel 210 the drive through the rack 268, gear 267, shaft 266, gear 264 and rack teeth 263 for the shank 261 and tamper or plunger 260 will be intermittent.

Fig. 15 illustrates the mandrel below the lower end of the tamper before the tamper has started to descend. Fig. 16 illustrates the tamper 260 in its extreme lower position, in which position the load has been pressed downwardly and the package with the load therein has been ejected or discharged from the mandrel and pushed downwardly between guide walls 280 and 281 and to a position on a support 328. When the package has been so deposited it is fed laterally by a reciprocating feeding mechanism shown in Figs. 17 and 18. A slide block 283 is slidably mounted on a guideway 284 carried by the wall 281 and is provided with a lug 285 which is adapted to engage the back of the package disposed between the walls 280 and 281 and to feed the package forwardly in the passageway between the two walls. The block 283 has a stud 286 projecting laterally therefrom to which is connected a link 287, the other end of the link being connected to a crank arm 288 carried by the shaft 183. This shaft is driven continuously in the manner hereinbefore described.

Mechanism for placing final end tucks in wrapper

Figures 17, 25, 26:
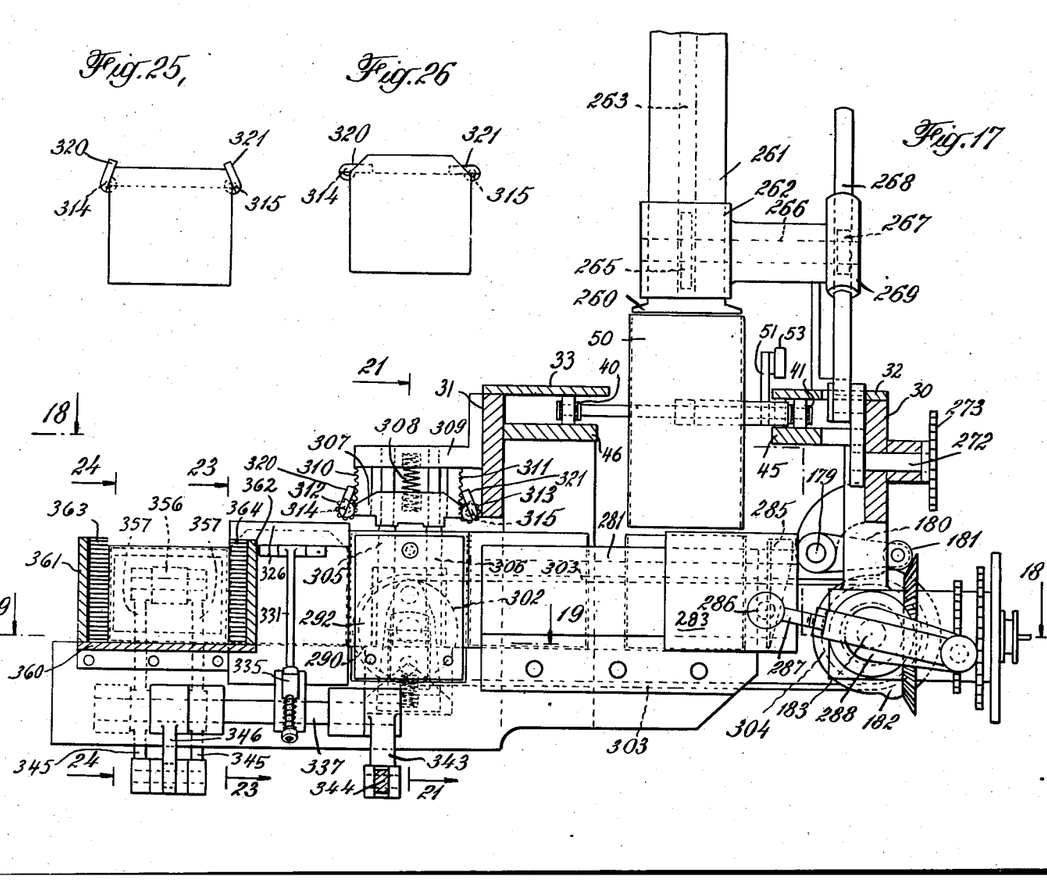
Fig. 17 is a sectional elevation taken on line 17—17 of Fig. 1C.
Fig. 25 is an elevational view somewhat diagrammatic showing the end tuckers prior to their tucking operation.
Fig. 26 is a view similar to Fig. 25 but showing the end tuckers in the completed position of operation for placing the end tucks in the wrapper.
Figure 21:
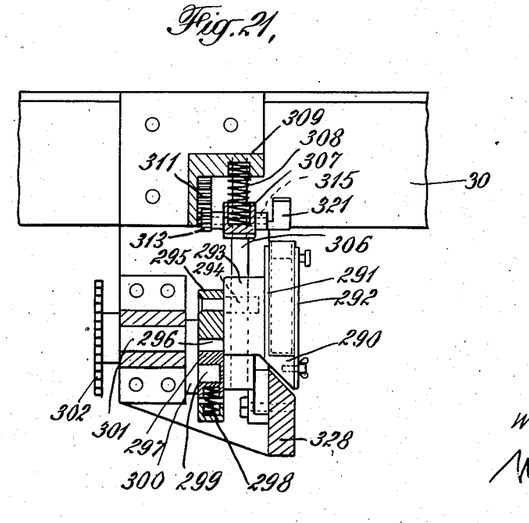
Fig. 21 is a sectional elevation taken substantially on line 21—21 of Fig. 18 and showing the mechanism for placing the end tucks in the wrapper.

For this mechanism attention is directed particularly to Figs. 17, 18, 21, 25 and 26. Fig. 20 shows the wrapper with the end tucks formed therein. An intermediate section of the guides, as shown in Figs. 17 and 21 is vertically reciprocable in a manner hereinafter described and for the purpose explained. This movable section which, as shown in Fig. 21, comprises a base 290 and walls 291 and 292. The base and walls are carried by a block 293 which is mounted on a pin 294 carried by a link 295. This link has a slot 296 which receives a block 297 movable between a cushion spring 298 and the upper end of the slot. The block has pivoted therein a pin 299 carried by a crank 300 which in turn is mounted on a shaft 301. This shaft has secured thereto a sprocket wheel 302 driven by a chain 303 from a sprocket wheel 304 mounted on the shaft 183, (Fig. 18).

As the parts are rotated in the manner above described, the crank 300 and pin 299 will oscillate and raise and lower the link 295 thereby vertically reciprocating the block 293. This block is mounted on vertical posts 305 and 306.

Above the vertically movable section which receives the loaded packages there is slidably mounted on the posts 305 and 306 a block 307 which is normally spring pressed downwardly by a spring 308 disposed between a bracket 309 and the block. The downward movement of this block 307 is limited in any suitable manner.

Figure 11:
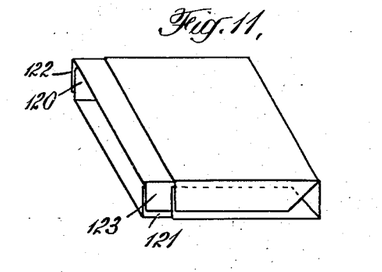
Fig. 11 is a perspective view similar to Fig. 8, but showing the paper cover folded around the tin foil wrapper.
Figure 12:
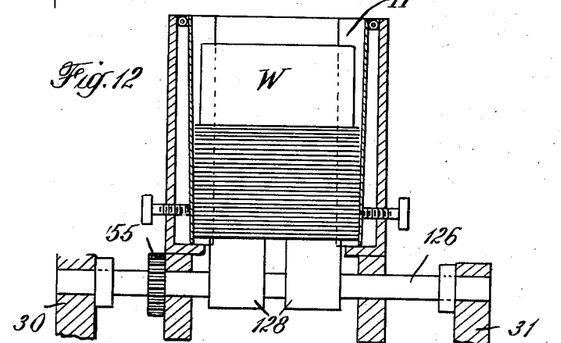
Fig. 12 is an enlarged sectional elevation of the hopper and label feeding means taken substantially on line 12—12 of Fig. 2B.

The bracket 309 has secured to its ends and extending downwardly therefrom a pair of stationary racks 310 and 311 which have teeth engaging gears 312 and 313 on spindles 314 and 315 carried by the outer ends of the block 307. As the vertically movable package supporting section comprising walls 291 and 292 of base 290 is moved upwardly in the manner hereinbefore described, the block 293 will engage the under surface of the block 307 and push this block upwardly against the action of the spring 308. During this movement the gears 312 and 313 by their engagement with the stationary racks 310 and 311 will rotate the spindles 314 and 315 thereby causing tuckers 320 and 321 carried by the spindle 314 and 315 to be oscillated inwardly or toward each other from the position shown in Fig. 25 to the position shown in Fig. 26 thereby tucking the ends of the upwardly projecting portions of the tin foil wrapper which, as shown in Fig. 11, extends beyond the upper end of the paper label or cover.

After these tucks have been formed the package is moved downwardly from the tucking mechanism and is then fed to the left viewing Figs. 17 and 18 to a position in which the upwardly projecting end flaps are folded one upon the other to close the package. The package is fed to the left by the feeding movement of the slide block 283 and lug 285 carried thereby, the lug engaging the end package and forcing this against the packages in front of this package in the guideway thereby successively feeding the packages therethrough.

Mechanism for placing final end folds in wrapper

This mechanism is illustrated particularly in Figs. 17, 18, 22 and 23. This folding mechanism comprises a pair of successively acting folding members 325 and 326 which are mounted on fixed pivots 327 at the upper ends of wall members 280 and 281. During the passage of the packages between the walls 280 and 281 they are supported on the base member 328.

The folding members 325 and 326 have connected thereto links 330 and 331 which are slidably mounted in and are pivoted to the outer ends 332 and 333 of arms 334 and 335 carried by shafts 336 and 337 rotatably mounted in lugs 338 and 339 carried by the member 328. The links 330 and 331 have mounted on their lower ends springs 340 which are positioned between collars 341 and the swivel connections to the arms 332 and 333. The downward movement of the links is limited by stop collars 342.

Figure 23:
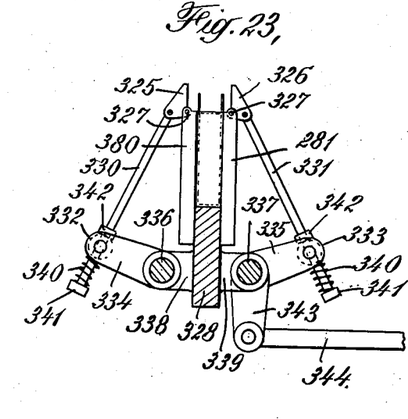
Fig. 23 is a vertical sectional elevation taken substantially on line 23—23 of Fig. 18 showing the folding mechanism for folding the end flaps.
Figure 24:
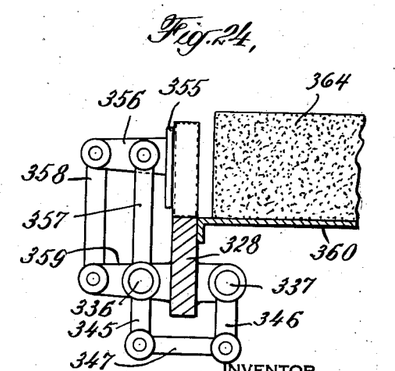
Fig. 24 is a sectional elevation taken substantially on line 24—24 of Fig. 18 showing the means for ejecting the completed package.

The shaft or spindle 337 has secured thereto and extending downwardly therefrom an arm 343 which is connected to one end of a link 344 (Fig. 23). The spindles 336 and 337 have secured thereto and extending downwardly therefrom links 345 and 346 which are connected by a link 347 (Fig. 24), these giving a parallel motion.

As the link 344 is reciprocated to the right and operates the arm 343 the spindle 337 is oscillated in an anticlockwise direction the outer end of the arm 335 causes the link 331 to be pushed upwardly thereby oscillating the folder 326 in an anticlockwise direction, thus folding downwardly one of the upwardly projecting end flaps. During this movement the connection 346, 347 and 345 to the shaft 336 causes this shaft to be rotated or oscillated in an anticlockwise direction which will compress the spring 340 on the rod 330 without causing any movement of the link or rod 330 and the member 335 connected thereto. During the reverse movement of the link 344 the folding member 325 will operate, but the member 326 will remain stationary. In actual operation, the folding member 325 operates first and the member 326 second.

The link 344 is operated as follows: The other end of the link 344 from that connected to arm 343 carries a roller 350 which engages a cam 351 mounted on the shaft 190 (Figs. 2D and 27). The link 344 is pivoted to a link 352 mounted on a fixed pivot 353 and engaged by a spring 354. This spring holds the roller 350 in engagement with the cam 351.

In the manner hereinbefore described it will be evident that the folding members 325 and 326 operate successively or alternately to fold the remaining end flaps of the tin foil wrapper, thus closing the package.

After the package has been closed it is ejected from the support 328 by a pusher 355 carried by a bracket 356. This bracket is mounted on the upper end of an arm 357 which forms an extension of the arm 345 above the spindle or shaft 336. The bracket 356 also has connected thereto a link 358, the lower end of which is connected to a fixed bracket 359. The movement of the link 347 which is connected to shaft 337 by link 343 is communicated through the links 346, 347 and 345 to the arm 357, thus swinging this arm forwardly and rearwardly to cause the pusher 355 to eject the articles from the support 328 to a table 360.

*Summary of operation*

The operation of the various mechanisms of the machine can be briefly summarized as follows:

The tin foil sheet is fed through the scoring, cutting, glue applying and folding mechanism, as shown in Figs. 1A and 2A. By this mechanism the sheet is scored thereby making it possible to form neat, rectangular bends in the wrapper to form a package having an attractive appearance. Without such scoring it is impossible to bend tin foil to form rectangular corners in a wrapper thereof.

The wrappers are folded around the intermittently traveling mandrels or formers and take the form illustrated in Fig. 8. The mandrel with the tin foil wrapper formed thereon is then fed into engagement with the paper wrapper or cover in the manner shown in Fig. 1B. The mechanism shown in this figure separates the paper wrappers one at a time from the bottom of the stack and feeds them through glue applying means into the path of movement of the mandrels.

These paper wrappers are then folded in the usual well known manner around the outside of the tin foil wrapper, as illustrated in Fig. 11. From this mechanism they pass on to presser means by means of which the end folds are securely pressed and dried.

The mandrels are then rotated through 90° to vertical position, as shown in Figs. 1C and 2C, and a load of tobacco is deposited therein in two lots or batches, passing downwardly from tobacco measuring and feeding means through funnels into the open upper ends of the mandrels. After the second load has been deposited the mandrels pass to the next position shown at Z in Fig. 1C in which position the tamper 260 descends into the upper end of the mandrel and forces the tobacco downwardly in the package and subsequently removes the package from the mandrel depositing it in a guide channel formed between two side walls 280 and 281 and on a support 328. The packages are then successively fed through the channel and between the side walls to a position between walls 291 and 292 and on a support 290. The block which is carried by this package supporting means is reciprocated periodically and as it moves upwardly causes tucking means 320 and 321 to move from the position shown in Fig. 25 to the position shown in Fig. 26 thereby forming end tucks in the package and more particularly in the tin foil wrapper, as shown in Fig. 20. This leaves two upwardly projecting end flaps which are folded by means of folding members 325 and 326, shown particularly in Fig. 23. After this operation has been completed the package moves to the next position in which it is ejected by means of a pusher 355 and deposited on a table 360. The packages are retained in upright position on the table between walls 361 and 362 having inwardly projecting brushes 363 and 364.

From the foregoing specification it will be evident that a simple, practical and efficient machine has been designed for forming tobacco packages with a tin foil liner and for filling and sealing these packages with predetermined quantities of material therein.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:

1. A package forming and feeding mechanism comprising a plurality of interconnected, spaced, hollow open ended mandrels, means for moving said mandrels step by step in a horizontal path, means for holding said mandrels in a horizontal position through a part of said path, means for wrapping a sheet around one end and the sides of each mandrel to form a package thereon while it is held in said horizontal position, means for successively tilting the wrapped mandrels and maintaining a plurality of said mandrels in vertical positions through another part of said horizontal path, and means for depositing predetermined quantities of materials through the mandrels into the packages thereon while they are maintained in vertical positions.

2. A package forming and feeding mechanism comprising a plurality of interconnected, spaced, hollow open ended mandrels, means for moving said mandrels step by step in a horizontal path, means for holding said mandrels in a horizontal position through a part of said path, means for wrapping a sheet around one end and the sides of each mandrel to form a package thereon while it is held in said horizontal position, means for successively tilting the wrapped mandrels and maintaining a plurality of said mandrels in vertical positions through another part of said horizontal path and means for simultaneously depositing predetermined quantities of materials through the mandrels into the packages thereon in successive positions of the vertically maintained mandrels.

3. A package forming and feeding mechanism comprising a plurality of interconnected, spaced, hollow, open ended mandrels, means for moving said mandrels step by step in a horizontal path, means for holding said mandrels in a horizontal position through a part of said path, means for wrapping a sheet around one end and the sides of each mandrel to form a package thereon while it is held in said horizontal position, means for successively tilting the wrapped mandrels and maintaining a plurality of said mandrels in vertical positions through another part of said horizontal path, means for simultaneously depositing predetermined quantities of materials through the mandrels into the packages thereon in successive positions of the vertically maintained mandrels, and means for ejecting the filled packages from the mandrels in another successive position of the mandrels.

4. A package forming and feeding mechanism comprising a plurality of interconnected, spaced, hollow, open ended mandrels, means for moving said mandrels step by step in a horizontal path, means for holding said mandrels in a horizontal position through a part of said path, means for wrapping a sheet around one end and the sides of each mandrel to form a package thereon while it is held in said horizontal position, means for successively tilting the wrapped mandrels and maintaining a plurality of said mandrels in vertical positions through another part of said horizontal path, means for simultaneously depositing predetermined quantities of materials through the mandrels into the packages thereon in successive positions of the vertically maintained mandrels, means for ejecting the filled packages from the mandrels in another successive position of the mandrels, and means for closing the sheet over each filled package.

5. A package forming and feeding mechanism comprising a plurality of interconnected, spaced, hollow open ended mandrels, means for moving said mandrels step by step in a horizontal path, means for holding said mandrels in a horizontal position through a part of said path, means for wrapping a sheet around one end and the sides of each mandrel to form a package thereon while it is held in said horizontal position, means for successively tilting the wrapped mandrels and maintaining a plurality of said mandrels in vertical positions through another part of said horizontal path, means for simultaneously depositing predetermined quantities of materials through the mandrels into the packages thereon in successive positions of the vertically maintained mandrels, and a plunger movable into the filled package in another position of the mandrels to tamp the material therein and eject the package from the mandrels.

6. A package forming and feeding mechanism comprising a plurality of interconnected, spaced, hollow open ended mandrels, means for moving said mandrels step by step in a horizontal path, means for holding said mandrels in a horizontal position through a part of said path, means for wrapping a sheet around one end and the sides of each mandrel to form a package thereon while it is held in said horizontal position, means for successively tilting the wrapped mandrels and maintaining a plurality of said mandrels in vertical positions through another part of said horizontal path, means for simultaneously depositing predetermined quantities of materials through the mandrels into the packages thereon in successive positions of the vertically maintained mandrels, a plunger movable into the filled package in another position of the mandrels to tamp the material therein and eject the package from the mandrels, and means for closing the sheet over each filled package.

7. A package forming and filling mechanism comprising a plurality of hollow, open ended mandrels, means to wrap a sheet around one end and a portion of each mandrel to form a package, intermittently operating means for moving said mandrels in a predetermined rectilinear path of movement, means operable on each mandrel as it reaches a predetermined point in said path of movement for tilting and positioning a plurality of said mandrels in a vertical position, and means for depositing a predetermined quantity of material through said mandrels into the packages thereon when the mandrels are disposed in vertical position.

8. A package forming and feeding mechanism comprising a plurality of interconnected, spaced, hollow, open ended mandrels, means for moving said mandrels step by step in a horizontal path, means for holding said mandrels in a horizontal position through a part of said path, means for wrapping a sheet around one end and the sides of each mandrel to form a package thereon while it is held in said horizontal position, means for successively tilting the wrapped mandrels and maintaining a plurality of said mandrels in vertical positions through another part of said horizontal path, a chamber above the vertically maintained mandrels for material to be fed, a plurality of spaced pockets below said chamber alined with the path of movement of the mandrels, a rotary disk valve in the chamber for controlling the passage of material to said pockets, a valve at the bottom of each pocket for controlling the discharge of material therefrom and means for opening said discharge valves simultaneously.

9. A package forming and feeding mechanism, comprising a plurality of interconnected, spaced, hollow, open ended mandrels, means for moving said mandrels step by step in a horizontal path, means for holding said mandrels in a horizontal position through a part of said path, means for wrapping a sheet around one end and the sides of each mandrel to form a package thereon while it is held in said horizontal position, means for successively tilting the wrapped mandrels and maintaining a plurality of said mandrels in vertical positions through another part of said horizontal path, a chamber above the vertically maintained mandrels for material to be fed, a plurality of spaced pockets below said chamber alined with the path of movement of the mandrels, a rotary disk valve in the chamber for controlling the passage of material to said pockets, a valve at the bottom of each pocket for controlling the discharge of material therefrom, a funnel interposed between each pocket and one of the vertically maintained mandrels, and means for opening said discharge valves simultaneously.

10. A package forming and feeding mechanism comprising a plurality of interconnected, spaced, hollow, open ended mandrels, means for moving said mandrels step by step in a horizontal path, means for holding said mandrels in a horizontal position through a part of said path, means for wrapping a sheet around one end and the sides of each mandrel to form a package thereon while it is held in said horizontal position, means for successively tilting the wrapped mandrels and maintaining a plurality of said mandrels in vertical positions through another part of said horizontal path, a chamber above the vertically maintained mandrels for material to be fed, a plurality of spaced pockets below said chamber alined with the path of movement of the mandrels, a rotary disk valve in the chamber for controlling the passage of material to said pockets, a valve at the bottom of each pocket for controlling the discharge of material therefrom, a funnel interposed between each pocket and one of the vertically maintained mandrels, means for opening said discharge valves simultaneously when the mandrels are in alinement with the pockets, a plunger movable into the filled package in another successive position of the mandrels to tamp the material therein and eject the package from the mandrel, and means for closing the sheet over each filled package.

WILHELM B. BRONANDER.